United States Patent
Usami

(10) Patent No.: US 11,509,237 B2
(45) Date of Patent: Nov. 22, 2022

(54) POWER CONVERSION DEVICE

(71) Applicant: TOSHIBA TEC KABUSHIKI KAISHA, Tokyo (JP)

(72) Inventor: Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 342 days.

(21) Appl. No.: 16/714,025

(22) Filed: Dec. 13, 2019

(65) Prior Publication Data
US 2020/0304038 A1 Sep. 24, 2020

(30) Foreign Application Priority Data
Mar. 20, 2019 (JP) .............................. JP2019-052977

(51) Int. Cl.
| | |
|---|---|
| *H02M 1/42* | (2007.01) |
| *H02M 7/219* | (2006.01) |
| *H02M 7/04* | (2006.01) |
| *H02M 3/335* | (2006.01) |
| *H02M 7/217* | (2006.01) |
| *H02M 1/00* | (2006.01) |

(52) U.S. Cl.
CPC ............ *H02M 7/04* (2013.01); *H02M 1/4208* (2013.01); *H02M 3/33546* (2013.01); *H02M 3/33569* (2013.01); *H02M 7/217* (2013.01); *H02M 1/0009* (2021.05); *H02M 1/4283* (2021.05); *H02M 7/219* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,751,567 | A | * | 5/1998 | Toyozaki | .............. H02M 7/219 363/89 |
| 5,978,243 | A | * | 11/1999 | Ishii | ...................... H02M 7/217 363/89 |

(Continued)

OTHER PUBLICATIONS

Cree, CRD-02AD09N, 2.2 KW, High Efficiency (80+ Titanium) Bridgeless Totem-Pole PFC with SiC MOSFET (TO-263-7), Cree Power Applications, Feb. 1, 2018, retrieved from https://www.wolfspeed.com/downloads/dl/file/id/1555/product/0/crd_02ad09n_application_note.pdf, retrieved on Jul. 9, 2020.

(Continued)

*Primary Examiner* — Gary A Nash
(74) *Attorney, Agent, or Firm* — Kim & Stewart LLP

(57) ABSTRACT

A power conversion device includes first and second current detectors. A coil is connected a first power terminal through the first and second current detectors. A first switch has a source terminal connected to the coil and a second semiconductor switch has a drain terminal connected to the coil. A first diode is connected between a drain terminal of the first semiconductor switch and a second power supply terminal. A second diode is connected between a source terminal of the second semiconductor switch and the second power terminal. A capacitor is connected in parallel with the first and second diodes. A control circuit is configured to turn the first and second semiconductor switches on or off based on current detections of the first and second current detectors.

20 Claims, 8 Drawing Sheets

(56) References Cited

U.S. PATENT DOCUMENTS

| | | | |
|---|---|---|---|
| 9,431,896 B2 | 8/2016 | Ye | |
| 9,590,494 B1* | 3/2017 | Zhou | H02M 7/219 |
| 9,632,564 B2* | 4/2017 | Murai | G06F 1/3287 |
| 9,780,691 B1* | 10/2017 | Usami | H02M 7/217 |
| 2008/0084201 A1* | 4/2008 | Kojori | G01R 19/0015 |
| | | | 324/117 R |
| 2012/0014149 A1* | 1/2012 | Usami | H02M 7/217 |
| | | | 363/84 |
| 2013/0147440 A1* | 6/2013 | Shiroyama | H02M 7/02 |
| | | | 320/166 |
| 2015/0023079 A1* | 1/2015 | Sawada | H02J 5/005 |
| | | | 363/127 |
| 2016/0241132 A1 | 8/2016 | Lin et al. | |
| 2016/0285353 A1* | 9/2016 | Kim | H03K 17/302 |
| 2017/0019029 A1* | 1/2017 | Gekinozu | H05K 7/209 |
| 2017/0033706 A1* | 2/2017 | Usami | H02M 1/4225 |

OTHER PUBLICATIONS

Liang Zou et al., 99% Efficiency True-Bridgeless Totem-Pole PFC Based on GaN HEMTs, Dec. 31, 2013, retrieved from https://pdfs.semanticscholar.org/37f5/05996289d3cb70aabac0c5d5066fb0aa6bb0.pdf, retrieved on Aug. 5, 2019.

Extended European Search Report dated Jul. 21, 2020, mailed in counterpart European Application No. 20152405.5, 7 pages.

* cited by examiner

POWER CONVERSION DEVICE

CROSS-REFERENCE TO RELATED APPLICATION

This application is based upon and claims the benefit of priority from Japanese Patent Application No. 2019-052977, filed on Mar. 20, 2019 the entire contents of which are incorporated herein by reference.

FIELD

Embodiments described herein relate generally to a power conversion device.

BACKGROUND

A power conversion device converts an alternating-current (AC) voltage obtained from an AC power supply into a direct-current (DC) voltage and supplies power to a load. When a voltage from an AC power supply is converted into a DC voltage, conversion of the current flowing in the AC power supply into a sinusoidal wave with the same phase as the AC voltage results in the best power factor and small harmonic wave noise occurs. A power conversion device may include a totem pole type power factor correction circuit for converting a current into a sinusoidal wave.

To control the totem pole type power factor correction circuit, it is necessary to detect alternation of a current flowing according to an input of an AC voltage. For example, a power conversion device that includes a current transformer detecting a current is put to practical use in this context. However, in such a configuration, detection results of current alternations are output as positive and negative signals. Therefore, such a detection result of the current alternation cannot be directly used by a control integrated circuit (IC) that controls the totem pole type power factor correction circuit. For this reason, insulation is necessary since the detection result of the current alternation is converted into a signal for which any GND value can serve as a standard or reference. There is the problem that such a circuit becomes complicated. Moreover, since a current transformer is typically expensive, there is the problem that cost increases.

DETAILED DESCRIPTION

In general, according to one embodiment, a power conversion device comprises a first current detector and a second current detector. The second current detector is connected between the first current detector and a first power supply terminal at which an alternating-current (AC) voltage can be supplied. A coil has a first end connected to the first power supply terminal through the first current detector and second current detectors connected in series. A first semiconductor switch has a source terminal connected to a second end of the coil. A second semiconductor switch has a drain terminal connected to the second end of the coil. A first diode has a cathode connected to a drain terminal of the first semiconductor switch and an anode connected to a second power supply terminal. A second diode has an anode connected to a source terminal of the second semiconductor switch and a cathode connected to the second power supply terminal. A smoothing capacitor is connected in parallel with the first and second diodes. The smoothing capacitor connected between the cathode of the first diode and the anode of the second diode. A control circuit is configured to turn the first and second semiconductor switches on or off based on a current detection of the first current detector and a current detection of the second current detector. In some examples, the power conversion device may be considered to comprise a totem pole type power factor correction circuit.

Hereinafter, example embodiments will be described with reference to the drawings.

Figure 1:
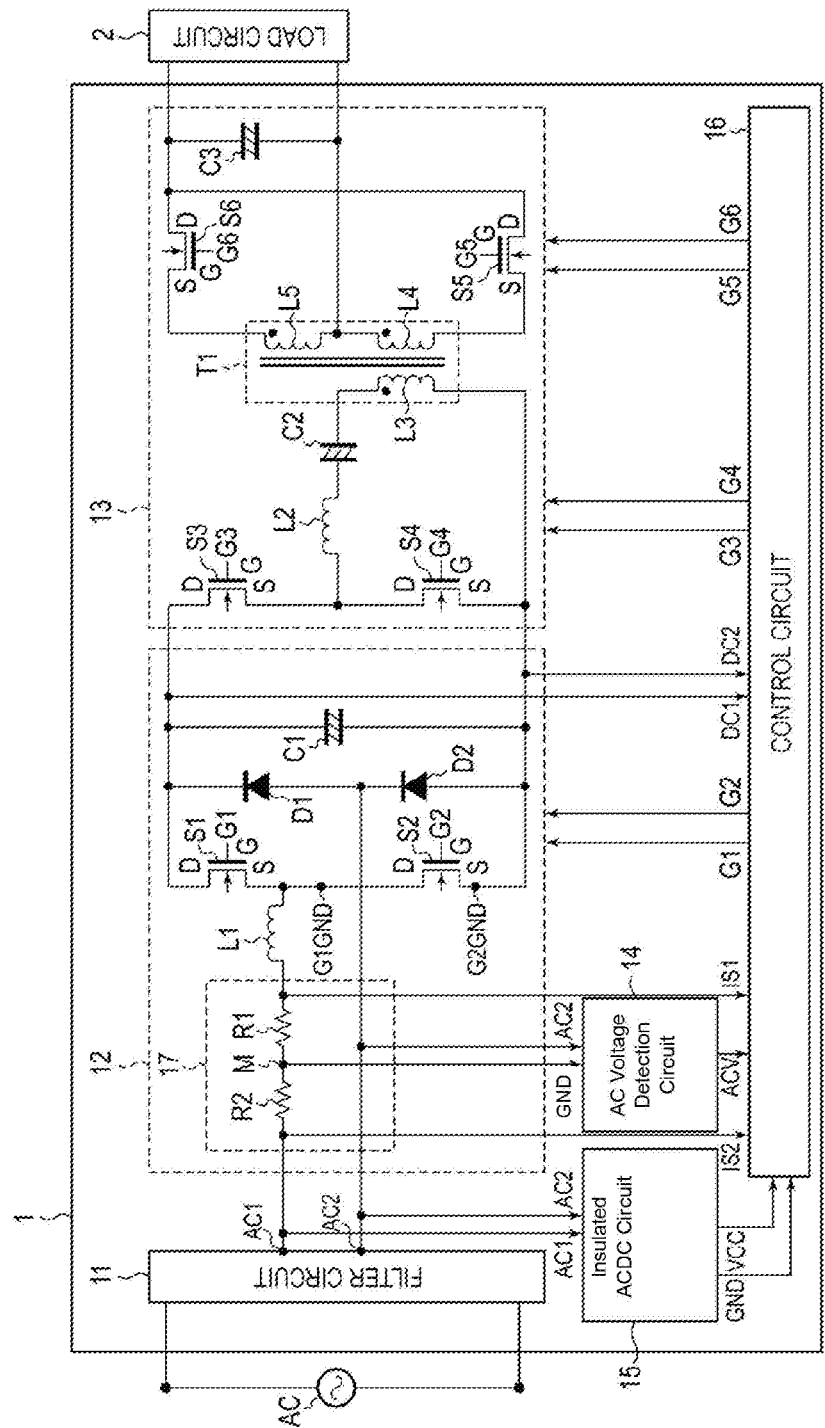
FIG. 1 depicts a power conversion device according to an embodiment.

FIG. 1 is a diagram illustrating an example of a configuration of a power conversion device 1 according to an embodiment. The power conversion device 1 includes a totem pole type power factor correction circuit. The power conversion device 1 is connected to an alternating-current power supply AC (also referred to as "power supply AC" for simplicity) that serves as an input power supply. The power conversion device 1 switches an AC voltage of the power supply AC at a high frequency and outputs a DC voltage to a load circuit 2.

The power conversion device 1 includes a filter circuit 11, a totem pole type power factor correction circuit ("totem pole PFC") 12, an LLC resonance circuit 13, an insulated ACDC circuit 15, an alternating-current (AC) voltage detection circuit 14, and a control circuit 16.

The filter circuit 11 is a circuit for removing noise leaking from the power conversion device 1 to the power supply AC. The filter circuit 11 is, for example, an EMC filter. The filter circuit 11 receives an AC voltage of 50 Hz as a commercially supplied frequency at an input terminal and outputs the AC voltage at an output terminal. High-frequency noise generated in the power conversion device 1 is blocked by the filter circuit 11. The filter circuit 11 includes a first terminal AC1 and a second terminal AC2 as output terminals. That is, AC power is output at the first terminal AC1 and the second terminal AC2.

The totem pole PFC 12 converts the AC voltage obtained from the power supply AC via the filter circuit 11 into a DC voltage and supplies this DC voltage to the LLC resonance circuit 13. The totem pole PFC 12 includes a first coil L1, a first semiconductor switch S1, a second semiconductor switch S2, a first diode D1, a second diode D2, a first smoothing capacitor C1, a first resistor R1, and a second resistor R2.

A first end of the first coil L1 is connected to a first terminal of the power supply AC via the filter circuit 11. The first end of the first coil L1 is connected to the first terminal AC1 via the first resistor R1 and the second resistor R2 connected in series.

The first semiconductor switch S1 and the second semiconductor switch S2 are switch elements that are turned on or off by control of the control circuit 16. The first semiconductor switch S1 and the second semiconductor switch S2 are formed of, for example, a wide bandgap semiconductor material such as SiC, GaN, gallium oxide, or diamond. Since an element formed of such a semiconductor material has a faster switching speed than MOSFET formed of silicon and also has a small floating capacitance between a drain and a source, a switching loss is small. In general, the first semiconductor switch S1 and the second semiconductor switch S2 each act like a switch element when a forward current is applied and a diode when a reverse current is applied. For an N-channel semiconductor device, forward current direction is a drain to source current flow. For a P-channel semiconductor device, forward current direction is a source to drain current flow.

The first semiconductor switch S1 is turned on or off by a gate signal G1 supplied from the control circuit 16. The second semiconductor switch S2 is turned on or off by a gate signal G2 supplied from the control circuit 16.

In the first semiconductor switch S1, a source terminal is connected to a second end of the first coil L1. In the second semiconductor switch S2, a drain terminal is connected to the source terminal of the first semiconductor switch S1.

For the first diode D1, the cathode is connected to a drain terminal of the first semiconductor switch S1 and the anode is connected to a second terminal of the power supply AC via the filter circuit 11. For the second diode D2, the anode is connected to a source terminal of the second semiconductor switch and the cathode is connected to the second terminal of the power supply AC via the filter circuit 11. In particular, the anode of the first diode D1 and the cathode of the second diode D2 are connected to the second terminal AC2

The first smoothing capacitor C1 is connected to the cathode of the first diode D1 and the anode of the second diode D2. A positive (first) electrode terminal of the first smoothing capacitor C1 and a negative (second) electrode terminal of the first smoothing capacitor C1 each provide an output terminal of a high-voltage DC output of the totem pole PFC 12. The positive electrode terminal and the negative electrode terminal of the first smoothing capacitor C1 are each respectively connected to the control circuit 16. Thus, the control circuit 16 is supplied with a signal DC1 in accordance with a potential of the positive electrode terminal of the first smoothing capacitor C1. The control circuit 16 is supplied with a signal DC2 in accordance with a potential of the negative electrode terminal of the first smoothing capacitor C1.

The first resistor R1 and the second resistor R2 are, as noted, connected in series between the first coil L1 and the first terminal AC1. The first resistor R1 is connected between the second resistor R2 and the first end of the first coil L1. That is, the first coil L1, the first resistor R1, the second resistor R2, and the first terminal AC1 are connected in this order from the second end of the first coil L1. Resistance values of the first resistor R1 and the second resistor R2 are, for example, relatively small values of about 0.01Ω. A connection point between the first resistor R1 and the second resistor R2 is referred to as a connection point M.

A connection point between the first resistor R1 and the first coil L1 is connected to the control circuit 16. A signal IS1 is provided to the control circuit 16 in accordance with a current flowing in the first resistor R1. When a current flows in the first resistor R1 towards the connection point M from the first coil L1, the signal IS1 is considered to have a positive voltage using the potential of the connection point M as a standard/reference. When a current flows in the first resistor R1 towards the first coil L1 from the connection point M, the signal IS1 is considered to have a negative voltage using the connection point M potential as a standard/reference.

A connection point between the second resistor R2 and the first terminal AC1 is connected to the control circuit 16. Thus, the control circuit 16 is supplied with a signal IS2 in accordance with a current flowing in the second resistor R2. When a current flows in the second resistor R2 towards the connection point M from the first terminal AC1, the signal IS2 has a positive voltage using the potential of the connection point M as a standard. When a current flows in the second resistor R2 towards the first terminal AC1 from the connection point M, the signal IS2 has a negative voltage using the potential of the connection point M as a standard.

With the foregoing configuration, when one of the signals IS1 and IS2 becomes a positive signal and the other becomes a negative signal. In such a configuration, the first resistor R1 and the second resistor R2 form a current detection circuit 17 that supplies the control circuit 16 with a signal having a positive voltage corresponding to a value of the current flowing in the first coil L1. The first resistor R1 functions as a first current detector. The second resistor R2 functions as a second current detector.

The LLC resonance circuit 13 is a DC-DC conversion circuit that supplies a DC voltage to the load circuit 2 from the high-voltage DC voltage supplied from the totem pole PFC 12. The LLC resonance circuit 13 includes a switching element S3, a switching element S4, a switching element S5, a switching element S6, a second coil L2, a first winding L3, a second winding L4, a third winding L5, and a second smoothing capacitor C2, and a third smoothing capacitor C3.

The switching element S3, the switching element S4, the switching element S5, and the switching element S6 are switching elements that are turned on or off by control of the control circuit 16. The switching element S3, the switching element S4, the switching element S5, and the switching element S6 are, for example, MOSFETs made of silicon. Since a resonance phenomenon is used in the LLC resonance circuit 13, high-speed switching is not necessary in operation. Therefore, unlike the totem pole PFC 12, MOSFETs made of silicon can be used for these switching elements (S3-S6).

The switching element S3 is turned on or off by a gate signal G3 supplied from the control circuit 16. The switching element S4 is turned on or off by a gate signal G4 supplied from the control circuit 16. The switching element S5 is turned on or off by a gate signal G5 supplied from the control circuit 16. The switching element S6 is turned on or off by a gate signal G6 supplied from the control circuit 16.

A drain terminal of the switching element S3 is connected to one output terminal of the totem pole PFC 12 (as depicted, the positive electrode terminal of the first smoothing capacitor C1). In the switching element S4, a source terminal is connected to the other output terminal of the totem pole PFC 12 (as depicted, the negative electrode terminal of the first smoothing capacitor C1) and a drain terminal is connected to a source terminal of the switching element S3. The second coil L2, the second smoothing capacitor C2, and the first winding L3 are connected in series between the source terminal of the switching element S4 and a connection point between the switching elements S3 and S4.

The first winding L3, the second winding L4, and the third winding L5 form a transformer T1. The second winding L4 and the third winding L5 are electrically insulated from the first winding L3 and are excited by a magnetic field generated in the first winding L3. The second winding L4 is connected to the third winding L5. The transformer T1 is configured so that the winding number ratio between the first winding L3 and the second winding L4 is equal to the winding number ratio between the first winding L3 and the third winding L5. Further, in the transformer T1, a winding number ratio (L3:L4) between the number of windings/turns of the first winding L3 and the second winding L4 and a winding number ratio (L3:L5) between the number of windings/turns of the first winding L3 and the third winding L5 are set by whether the LLC resonance circuit 13 is to perform a boosting or a stepdown. For example, when the LLC resonance circuit 13 is configured as a circuit that lowers a voltage (performs a voltage stepdown), a winding number ratio is set so that the winding numbers of the second winding L4 and the third winding L5 on the secondary side are less than that of the first winding L3 on the primary side, such as the winding number ratio (L3:L4) and the winding number ratio (L3:L5) being 20 (turns):5 (turns).

In the foregoing configuration, an alternating current flows in the second coil L2 when the switching elements S3 and S4 are turned on or off. An alternating current equal to that of the second coil L2 flows in the first winding L3. Thus, a magnetic field that changes in accordance with an alternating current is generated in the transformer T1. In the second winding L4 and the third winding L5, an induced voltage is generated by the change in the magnetic field (a change in a magnetic flux) generated in the transformer T1. The induced voltage causes an alternating current to flow in the second winding L4 and the third winding L5. Specifically, a positive half-wave part of the alternating current flows in the second winding L4 and a negative half-wave part of the alternating current flows in the third winding L5. That is, in each of the second winding L4 and the third winding L5, a current with an opposite phase flows as a half wave. These currents are transformed into positive currents by the switching element S5 and the switching element S6 by synchronous rectification. These currents are both charged to the third smoothing capacitor C3 as a positive current.

In the switching element S5, a source terminal is connected to the second winding L4 and a drain terminal is connected to a positive electrode terminal of the third smoothing capacitor C3. In the switching element S6, a source terminal is connected to the third winding L5 and a drain terminal is connected to the positive electrode terminal of the third smoothing capacitor C3. A negative electrode terminal of the third smoothing capacitor C3 is connected to a connection point between the second winding L4 and the third winding L5. The load circuit 2 is connected to the third smoothing capacitor C3 in parallel.

In the foregoing configuration, the switching element S5 functions as a body diode that causes a current to flow from the second winding L4 to the positive electrode terminal of the third smoothing capacitor C3. Similarly, the switching element S6 functions as a body diode that causes a current to flow from the third winding L5 to the positive electrode terminal of the third smoothing capacitor C3.

In the foregoing configuration, a current flows by a voltage generated in the second winding L4 and the third winding L5 so that the third smoothing capacitor C3 is charged when the switching elements S5 and S6 are turned on or off at a timing at which an alternating current flows in the first winding L3. Thus, DC power is supplied to the load circuit 2 connected to the third smoothing capacitor C3.

Specifically, the switching elements S5 and S6 are turned on by the gate signals G5 and G6 supplied from the control circuit 16 when the corresponding body diode has a current flowing therein. Thus, a junction voltage of 1V of the body diode is not applied and conduction resistance of 0.01Ω or the like is applied instead. For example, a current flowing in the switching elements S5 and S6 is assumed to be 10 A. A loss when the switching elements S5 and S6 are not turned on and functioning as body diodes satisfies 1V×10 A=10 W. A loss when the switching elements S5 and S6 are turned on satisfies 0.01Ω×(10 A)$^2$=1 W, and thus the loss can be reduced.

Hereinafter, a potential of the connection point M between the first resistor R1 and the second resistor R2 is assumed to be ground (GND) potential in the description. The AC voltage detection circuit 14 generates a signal ACV using GND (which is a potential of the connection point M between the first resistor R1 and the second resistor R2) as a reference and supplies the signal ACV to the control circuit 16. The insulated ACDC circuit 15 generates a DC voltage VCC based on an AC voltage of the supply AC but does so while insulated from the power supply AC. The insulated ACDC circuit 15 is connected to the first terminal AC1 and the second terminal AC2 of the filter circuit 11. The insulated ACDC circuit 15 receives a part of the AC voltage supplied from the first terminal AC1 and the second terminal AC2 uses a voltage necessary for an operation of the control circuit 16 to generate the DC voltage VCC. The control circuit 16 performs various kinds of signal processing and signal output using GND as a reference point.

The alternating-current voltage detection circuit 14 detects an AC voltage of the power supply AC and supplies a detection result (signal ACV) to the control circuit 16. The AC voltage detection circuit 14 is connected to the connection point M between the first resistor R1 and the second resistor R2 and the second terminal AC2 of the filter circuit 11. Since a resistance value of the second resistor R2 is a minimal value, the potential of the connection point M can be considered to be substantially equal to the potential of the first terminal AC1. That is, the AC voltage detection circuit 14 provides a signal alternating current voltage ("signal ACV") indicating the voltage supplied by the power supply AC based on the potential of the first terminal AC1 of the filter circuit 11 and the potential of the second terminal AC2 of the filter circuit 11 and supplies this signal ACV to the control circuit 16. The AC voltage detection circuit 14 may be configured to supply the signal ACV as an analog value to the control circuit 16 or may be configured to supply the signal ACV as a digital value to the control circuit 16. Hereinafter, the potential of the first terminal AC1 of the filter circuit 11 is simply referred to as "AC1" and the potential of the second terminal AC2 of the filter circuit 11 is simply referred to as "AC2."

The control circuit 16 controls the switching elements of the LLC resonance circuit 13 and the totem pole PFC 12. The control circuit 16 receives the DC voltage VCC for an operation from the insulated ACDC circuit 15. The control circuit 16 receives the signal ACV from the AC voltage detection circuit 14. The control circuit 16 receives the signals IS1 and IS2 from the current detection circuit 17. As described above, the signals IS1 and IS2 are signals corresponding a GND reference, which is the potential of the connection point M. The control circuit 16 receives the signals DC1 and DC2 from the output terminals of the totem pole PFC 12.

The control circuit 16 generates the gate signals G1 and G2 to turn on or off the first semiconductor switch S1 and the second semiconductor switch S2 based on the signal ACV, the signal IS1, the signal IS2, the signal DC1, and the signal DC2 and sends the gate signals G1 and G2 to the totem pole PFC 12. Thus, the control circuit 16 controls pulse widths of the gate signals G1 and G2 so that the current flowing in the first coil L1 is a sinusoidal wave with the same phase as the phase of the input AC voltage.

The control circuit 16 generates the gate signals G3 to G6 to turn the switching elements S3, S4, S5, and S6 on or off based on the output voltage of the LLC resonance circuit 13 and sends the gate signals G3 to G6 to the LLC resonance circuit 13.

The totem pole PFC 12 operates based on the gate signals G1 and G2 from the control circuit 16, as described above. For example, the totem pole PFC 12 operates while switching among four states illustrated in FIG. 2.

A first state is a state in which AC1>AC2 is satisfied, the first semiconductor switch S1 is turned off by the gate signal G1, and the second semiconductor switch S2 is turned on by the gate signal G2. In this case, a current flows in the directional order of the second resistor R2, the first resistor R1, the first coil L1, the second semiconductor switch S2, and the second diode D2. At this time, in the second resistor R2, a positive voltage (signal) is generated with the connection point M as GND. In the first resistor R1, a negative voltage (signal) that is not used for control is generated.

A second state is a state in which AC1>AC2 is also satisfied, the first semiconductor switch S1 is turned off by the gate signal G1, but the second semiconductor switch S2 is turned off by the gate signal G2. In this case, the first semiconductor switch S1 functions as a body diode from the source terminal to the drain terminal. Therefore, a current flows in the directional order of the second resistor R2, the first resistor R1, the first coil L1, the first semiconductor switch S1, the first smoothing capacitor C1, and the second diode D2. Even this case, in the second resistor R2, a positive voltage (signal) is generated using the connection point M as GND. In the first resistor R1, a negative voltage (signal) unused for control is generated.

A third state is a state in which AC1<AC2 is satisfied, the first semiconductor switch S1 is turned on by the gate signal G1, and the second semiconductor switch S2 is turned off by the gate signal G2. In this case, a current flows in the directional order of the first diode D1, the first semiconductor switch S1, the first coil L1, the first resistor R1, and the second resistor R2. At this time, in the first resistor R1, a positive voltage (signal) is generated using the connection point M as GND. In the second resistor R2, a negative voltage (signal) unused for control is generated.

Figure 2:
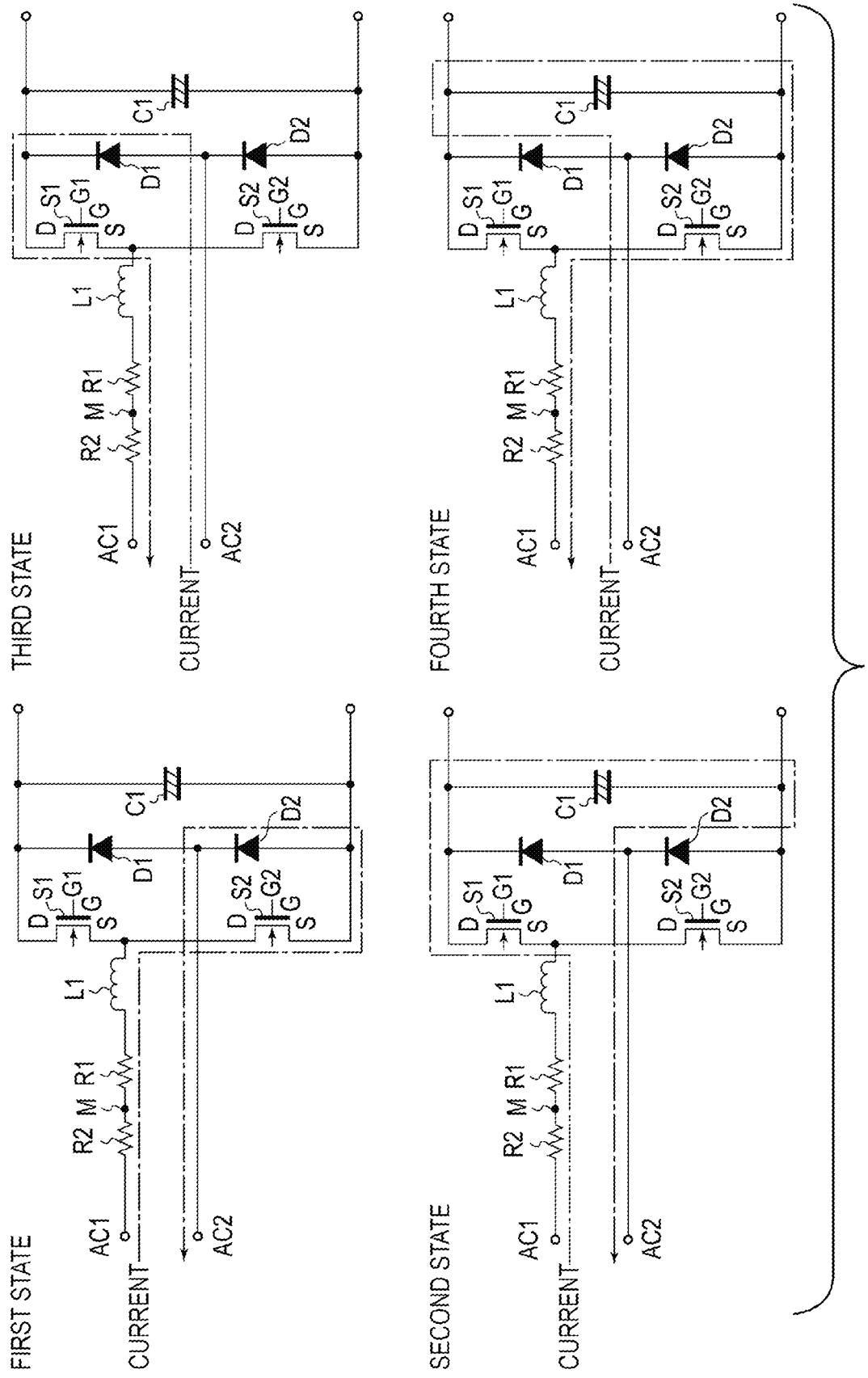
FIG. 2 depicts an operation of a totem pole PFC.

A fourth state is a state in which AC1<AC2 is again satisfied, the first semiconductor switch S1 is turned off by the gate signal G1, and the second semiconductor switch S2 is turned off by the gate signal G2. In this case, the second semiconductor switch S2 functions as a body diode from the source terminal to the drain terminal. Therefore, as illustrated in FIG. 2, a current flows in the directional order of the first diode D1, the first smoothing capacitor C1, the second semiconductor switch S2, the first coil L1, the first resistor R1, and the second resistor R2. Even this case, in the first resistor R1, a positive voltage (signal) is generated using the connection point M as GND. In the second resistor R2, a negative voltage (signal) unused for control is generated.

The control circuit 16 turns the second semiconductor switch S2 on or off when AC1>AC2 is satisfied. Thus, the control circuit 16 performs control such that a current flowing in the first coil L1 is a sinusoidal wave current with the same phase as the AC voltage AVC corresponding to the power supply AC while AC1 is greater than AC2. The control circuit 16 turns the first semiconductor switch S1 on or off when AC1<AC2 is satisfied. Thus, the control circuit 16 performs control such that a current flowing in the first coil L1 is a sinusoidal wave current with the same phase as the AC voltage AVC corresponding to the power supply AC while AC1 is less than AC2. Thus, it is possible to prevent current harmonic wave noise from occurring.

Figure 3:
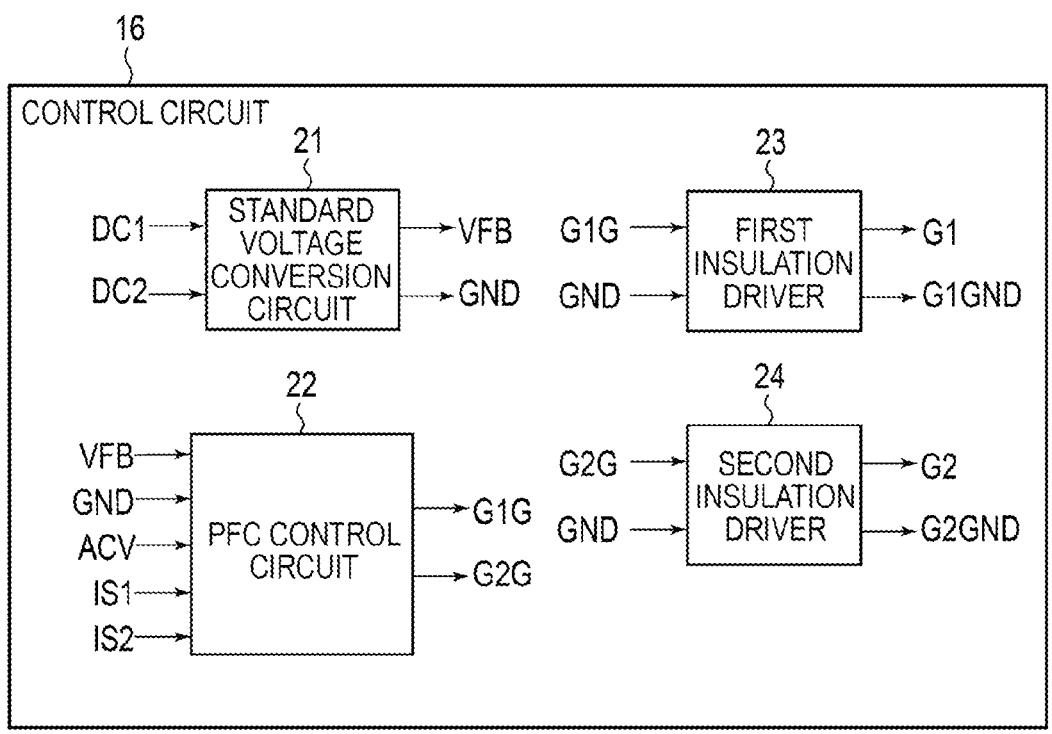
FIG. 3 depicts a configuration of a control circuit.

FIG. 3 is an explanatory diagram illustrating an example of the configuration of the control circuit 16.

The control circuit 16 includes a standard voltage conversion circuit 21, a PFC control circuit 22, a first insulated driver 23, and a second insulated driver 24.

The standard voltage conversion circuit 21 outputs an output voltage of the totem pole PFC 12 as a signal VFB indicating a voltage of the GND standard (reference). In the totem pole PFC 12, AC2 and DC2 are at the same potential when AC1>AC2 is satisfied, and AC1 and DC1 are at the same potential when AC1<AC2 is satisfied. In this way, a standard voltage may vary for an output of the totem pole PFC 12. Accordingly, the standard voltage conversion circuit 21 converts the signals DC1 and DC2 received from the output terminal of the totem pole PFC 12 into the signal VFB corresponding to the voltage of the GND standard.

Figure 4:
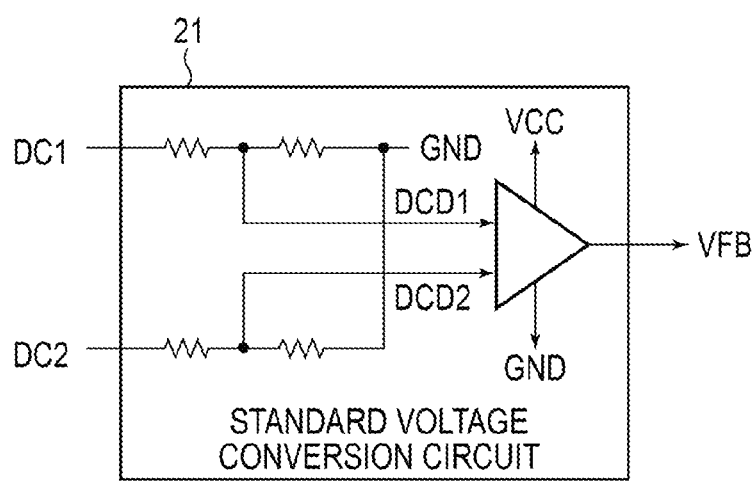
FIG. 4 depicts a configuration of a standard voltage conversion circuit.

FIG. 4 is an explanatory diagram illustrating an example of a configuration of the standard voltage conversion circuit 21. The standard voltage conversion circuit 21 includes resistors and an operational amplifier. The standard voltage conversion circuit 21 voltage divides the potential of each of the signals DC1 and DC2 by the GND standard and inputs divided signals DCD1 and DCD2 to two terminals of the operational amplifier. In this case, resistance values of the resistors are determined so that the divided voltage values do not exceed the DC voltage VCC. That is, the signals DCD1 and DCD2 are indicated as potentials equal to or greater than GND and equal to or less than VCC. The operational amplifier outputs a difference between the signals DCD1 and DCD2 as the signal VFB.

In other examples, the standard voltage conversion circuit 21 may be configured to output the signal VFB in accordance with another method. For example, the standard voltage conversion circuit 21 may convert a potential difference between the signals DC1 and DC2 into a pulse width and input the pulse to a photocoupler or the like. In such a case, a pulse conductive current of the GND standard is generated. A voltage in accordance with the pulse width is regenerated. Thus, a potential difference between portions with different potentials can be converted into a signal relative to GND standard.

Figure 5:
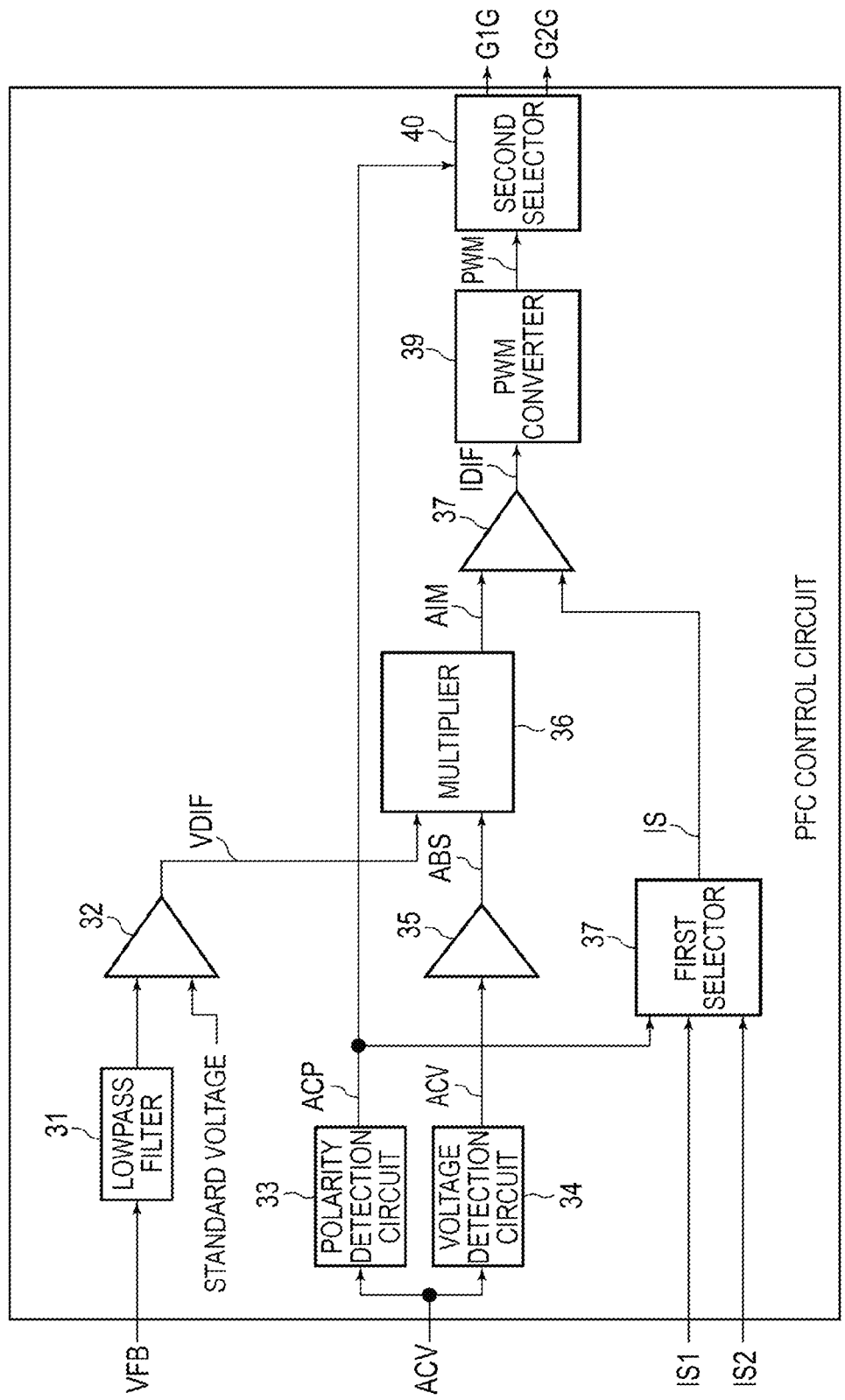
FIG. 5 depicts a configuration of a PFC control circuit.

FIG. 5 is an explanatory diagram illustrating an example of a configuration of the PFC control circuit 22. The PFC control circuit 22 outputs signals G1G and G2G to be used for controlling the first semiconductor switch S1 and the second semiconductor switch S2 of the totem pole PFC 12 based on the signal VFB, the signal ACV, the signal IS1, and the signal IS2.

The PFC control circuit 22 includes a lowpass filter 31, a first comparator 32, a polarity detection circuit 33, a voltage detection circuit 34, an absolute value conversion circuit 35, a multiplier 36, a first selector 37, a second comparator 38, a PWM converter 39, and a second selector 40.

The signal VFB is input to the lowpass filter 31. The lowpass filter 31 cuts/filters out a high-frequency component of the input signal VFB. The filtered signal is input to the first comparator 32. In the lowpass filter 31, for example, a frequency lower than a frequency cutoff of 50 Hz corresponding to the AC power supply is set to pass. For example, the lowpass filter 31 is set so that the frequency component of signal VFB lower than 20 Hz is passed. That is, the lowpass filter 31 is configured so that a frequency component higher than 20 Hz is removed. In this configuration, the lowpass filter 31 can remove/cancel out a component of 100 Hz (a full wave of 50 Hz) that might be generated in the first smoothing capacitor C1 and output an average value of voltages of the first smoothing capacitor C1.

An output of the lowpass filter 31 and a standard (reference) voltage are input to the first comparator 32. The first comparator 32 outputs a comparison result between the standard voltage and the output of the lowpass filter 31 to the multiplier 36. That is, the first comparator 32 outputs a signal VDIF, which is a comparison result between the standard voltage and a low frequency component of the signal VFB. Specifically, the first comparator 32 subtracts the standard voltage from the low frequency component of the signal VFB and outputs a result as a signal VDIF. That is, the signal VDIF indicates a difference between the signal VFB and the standard voltage.

Any value can be set as the standard voltage in this context. The standard voltage is set to, for example, 400 V. By setting the standard voltage to 400 V, it is possible to correspond to AC voltages utilized in the world, since the highest AC voltage typically utilized commercially in the world is 264 V, a peak value of such a voltage is 372 V, which is 1.41 times 264 V. By setting the standard voltage to be higher than this AC voltage, it is possible to realize power conversion throughout the world.

The polarity detection circuit 33 detects polarity of an AC voltage supplied from the power supply AC based on the signal ACV and outputs a detection result as the signal ACP. The polarity detection circuit 33 outputs the signal ACP to the first selector 37 and the second selector 40. The polarity detection circuit 33 outputs a logical value of "0" or "1" as the signal ACP based on whether the value of the signal ACV is positive or negative. For example, the signal ACV is configured to indicate a potential of the first terminal AC1 with respect to the second terminal AC2 of the filter circuit 11. In this case, the polarity detection circuit 33 outputs the signal ACP of "1" when the signal ACV is positive. The polarity detection circuit 33 outputs the signal ACP of "0" when the signal ACV is negative. That is, the polarity detection circuit 33 outputs the signal ACP of "1" when the potential of the first terminal AC1 is greater than the potential of the second terminal AC2. The polarity detection circuit 33 outputs the signal ACP of "0" when the potential of the first terminal AC1 less than the potential of the second terminal AC2.

The voltage detection circuit 34 converts the signal ACV into a signal within a normalized range and outputs this signal to the absolute value conversion circuit 35. The signal ACV input to the voltage detection circuit 34 can have an instantaneous value between −141 V and 141 V if the power supply AC is an AC power supply with an effective value of 100 V. The voltage detection circuit 34 converts the instantaneous value of the AC voltage indicated by the signal ACV into a value within a preset range. That is, the voltage detection circuit normalizes the instantaneous value of the AC voltage. Specifically, the voltage detection circuit 34 converts the instantaneous value of the AC voltage indicated by the signal ACV into an instantaneous value within a range of −1 to 1. The phase the sinusoidal supply wave can be determined based on the signal ACV after converted by the voltage detection circuit 34. That is, the signal ACV normalized by the voltage detection circuit 34 can be considered as sinusoidal wave phase information.

The absolute value conversion circuit 35 converts the signal ACV output from the voltage detection circuit 34 into a signal ABS, which is a signal corresponding to an absolute value of the signal ACV, and outputs the signal ABS to the multiplier 36. The absolute value conversion circuit 35 converts the signal ACV into a signal of 0 to 1 (that is, a signal with a full-wave rectified shape) by converting the signal ACV output from the voltage detection circuit 34 into an absolute value.

The multiplier 36 multiplies the signal VDIF, supplied from the first comparator 32, by the signal ABS, supplied from the absolute value conversion circuit 35. The multiplier 36 outputs the result as a signal AIM to the second comparator 38. The signal AIM indicates a target current value.

The signal ACP, the signal IS1, and the signal IS2 are input to the first selector 37. The first selector 37 outputs one of the signals IS1 or IS2 based on the signal ACP as the signal IS to the second comparator 38. When the signal ACP is "1", the first selector 37 outputs the signal IS2 to the second comparator 38 as the signal IS. When the signal ACP is "0", the first selector 37 outputs the signal IS1 to the second comparator 38 as the signal IS. That is, when the potential of the first terminal AC1 is greater than the potential of the second terminal AC2, the first selector 37 outputs the signal IS2 to the second comparator 38. When the potential of the first terminal AC1 is less than the potential of the second terminal AC2, the first selector 37 outputs the signal IS1 to the second comparator 38.

The signal AIM and the signal IS are input to the second comparator 38. The second comparator 38 outputs a signal IDIF to the PWM converter 39. The signal IDIF corresponds to a comparison between the signal AIM and the signal IS. The signal IDIF indicates a difference between the signal AIM, which is the target current value, and the signal IS, which indicates the actually flowing current.

The PWM converter 39 generates a signal PWM, which is a pulse width modulation signal, based on a value of the signal IDIF. The signal PWM is output to the second selector 40. For example, when the actually flowing current is less than the target current value, the PWM converter 39 increases a pulse width of signal PWM, and when the actually flowing current is greater than the target current value, the PWM converter 39 decreases a pulse width of signal PWM.

The signal ACP and the signal PWM are input to the second selector 40. Based on the signal ACP, the second selector 40 switches between outputting the signal PWM, as a signal G1G, to the first insulated driver 23 or output the signal PWM, as the signal G2G, to the second insulated driver 24. Specifically, when the signal ACP is "1", the second selector 40 outputs the signal PWM (as the signal G2G) to the second insulated driver 24. When the signal ACP is "0", the second selector 40 outputs the signal PWM (as the signal G1G) to the first insulated driver 23. The signal PWM (and thus also the signal G1G and signal G2G), is a signal corresponding to the GND standard. A stop signal ("0") is supplied to the driver (one of first insulated driver 23 and second insulated driver 24) that is not presently being supplied with the signal PWM.

In the first insulated driver 23 and the second insulated driver 24, the signals input to the primary side are insulated from the signals output from the secondary side. That is, there is no direct electrical connections between primary and secondary sides.

Figure 6:
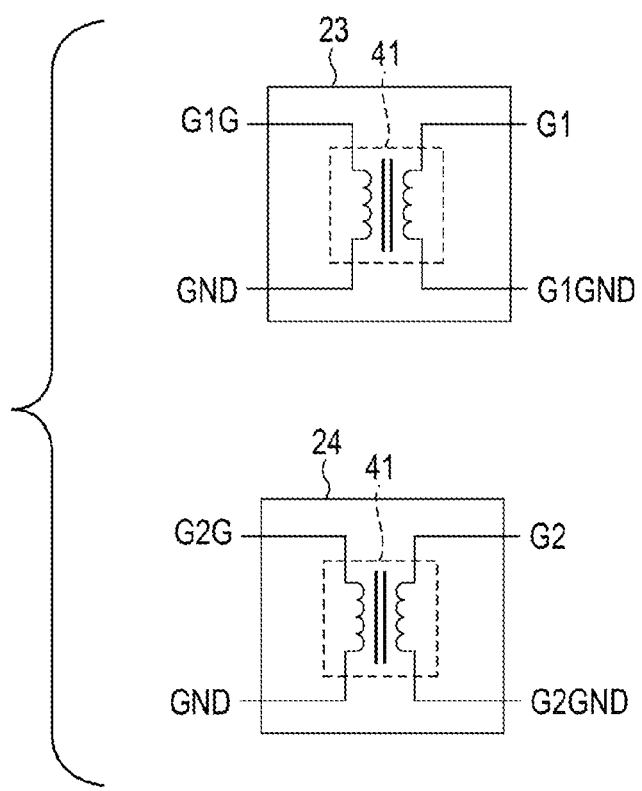
FIG. 6 depicts example configurations of a first insulated driver and a second insulated driver.

FIG. 6 is an explanatory diagram illustrating examples of configurations of the first insulated driver 23 and the second insulated driver 24. Each of the first insulated driver 23 and the second insulated driver 24 includes, for example, a pulse transformer 41. The pulse transformer 41 includes a primary-side winding, a secondary-side winding, and a magnetic core.

As illustrated in FIG. 6, GND and G1G are connected to the primary-side winding of the pulse transformer 41 of the first insulated driver 23, and G1 and G1GND are connected to the secondary-side winding of the pulse transformer 41. Specifically, GND and the second selector 40 of the totem pole PFC 12 are connected to the primary-side winding of the pulse transformer 41. The gate terminal of the first semiconductor switch S1 and the source terminal of the first semiconductor switch S1 are connected to the secondary-side winding of the pulse transformer 41.

The signal G1G is a pulsed signal output from the totem pole PFC 12 that is input to the primary-side winding of the pulse transformer 41 of the first insulated driver 23. When the signal G1G is input to the primary-side winding of the pulse transformer 41, an induced voltage is generated in the secondary-side winding of the pulse transformer 41. In accordance with the induced voltage, the potential G1GND of the source terminal of the first semiconductor switch S1 from the secondary-side winding of the pulse transformer 41 is set as a standard and the signal G1, which is a pulsed signal in accordance with the signal G1G, is input to the gate terminal of the first semiconductor switch S1. Thus, the first semiconductor switch S1 is turned on or off based on the signal G1.

As illustrated in FIG. 6, G2G and GND are connected to the primary-side winding of the pulse transformer 41 of the second insulated driver 24, and G2 and G2GND is connected to the secondary-side winding of the pulse transformer 41. Specifically, GND and the second selector 40 of the totem pole PFC 12 are connected to the primary-side winding of the pulse transformer 41. The gate terminal of the second semiconductor switch S2 and the source terminal of the second semiconductor switch S2 are connected to the secondary-side winding of the pulse transformer 41.

The signal G2G output from the totem pole PFC 12 is input to the primary-side winding of the pulse transformer 41 of the second insulated driver 24. When the signal G2G is input to the primary-side winding of the pulse transformer 41 of the second insulated driver 24, an induced voltage is generated in the secondary-side winding of the pulse transformer 41 of the second insulated driver 24. In accordance with the induced voltage, the potential G2GND of the source terminal of the second semiconductor switch S2 from the secondary-side winding of the pulse transformer 41 of the second insulated driver 24 is set as a standard and the signal G2 which is a pulsed signal in accordance with the signal G2G is input to the gate terminal of the second semiconductor switch S2.

The first insulated driver 23 and the second insulated driver 24 may further include a filter capacitor that is connected to the primary-side winding of the respective pulse transformer 41 in series to remove a DC component.

The signals G1 and G2 are signals which are positive or negative centering on G1GND and G2GND, respectively. Therefore, a winding number ratio of coils of the pulse transformer 41 may be adjusted so that values of the signals G1 and G2 are doubled (become the same voltage as that of the primary side).

The first insulated driver 23 and the second insulated driver 24 may further include a filter capacitor that is connected to the secondary-side coil of the respective pulse transformer 41 in series to remove a DC component.

In the first insulated driver 23 and the second insulated driver 24, the signals G1G and G2G may be converted into the signals G1 and G2 by photocouplers. However, since a signal output from the photocoupler is typically weak, a buffer circuit may be further provided.

In the first insulated driver 23 and the second insulated driver 24, in accordance with a bootstrap method, a signal output from the photocoupler may be boosted by a DC power supply for boosting and may be input to the gate terminal of the second semiconductor switch S2. For example, when the signal G2 is turned on, the potential of G1GND becomes equal to the potential of G2GND. When the DC power supply for boosting is connected to the G2GND side, a potential of the DC power supply for boosting is also supplied to G1GND via the body diode of the second semiconductor switch S2. Thereafter, when the signal G2 is turned off, the potential of G1GND is different from the potential of G2GND, but the potential of the G1GND standard is stored. The signal output from the photocoupler may be amplified using this potential to be input to the gate terminal of the first semiconductor switch S1.

Figure 7:
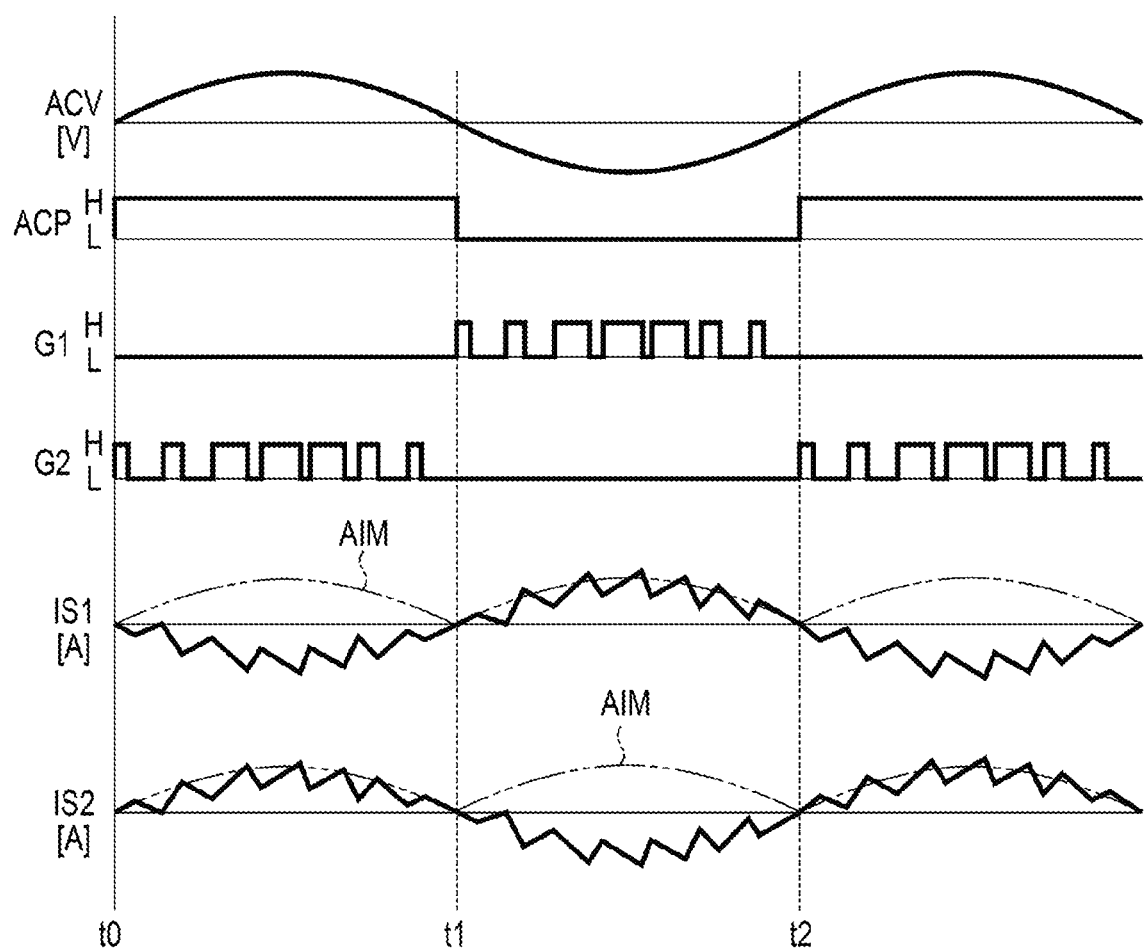
FIG. 7 depicts aspects of a control of a totem pole PFC.

FIG. 7 is an explanatory diagram illustrating a relation between a current flowing in the totem pole PFC 12 and a voltage of the power supply AC. FIG. 7 illustrates examples of the signal ACV indicating a voltage of the power supply AC, a signal ACP indicating a result of polarity detection, the signal G1 input to the gate terminal of the first semiconductor switch S1, the signal G2 input to the gate terminal of the second semiconductor switch S2, the signal IS1 indicating a current flowing in the first resistor R1, and the signal IS2 indicating a current flowing in the second resistor R2. In the examples of FIG. 7, the polarity is positive (AC1>AC2) between timing t0 to timing t1, the polarity is negative (AC1<AC2) between timing t1 to timing t2, and the polarity is positive (AC1>AC2) again after timing t2.

As described above, the polarity detection circuit 33 outputs the signal ACP with the logical value of "1" while AC1>AC2 is satisfied and outputs the signal ACP with the logical value of "0" while AC1<AC2 is satisfied.

The control circuit 16 of the totem pole PFC 12 continuously calculates the signals AIM indicating target currents based on the signal VFB indicating an output voltage of the totem pole PFC 12 and the signal ACV indicating the AC voltage.

The control circuit 16 generates a signal PWM based on a signal IDIF, which is a comparison result between the signal AIM and the signal IS2, while AC1>AC2 is satisfied. That is, the control circuit 16 generates the signal PWM so that a difference between the signal AIM and the signal IS2 decreases and supplies the signal PWM (as the signal G2) to the gate terminal of the second semiconductor switch S2. Thus, the totem pole PFC 12 turns the second semiconductor switch S2 on or off with the signal G2 while AC1>AC2 is satisfied. Thus, the totem pole PFC 12 switches between the first and second states illustrated in FIG. 2 in accordance with the signal G2. In the first state, the signal IS2 increases (linearly increases). In the second state, the signal IS2 decreases (linearly decreases). The totem pole PFC 12 controls the durations of the first and second states by performing pulse width control. Specifically, the totem pole PFC 12 controls the ON duty of the signal G2 (equivalent to the duration of the first state within one period) by fixing a frequency. Thus, the duration of the second state (which is the duration of the first state subtracted from the duration within one period) is also simultaneously determined. In this way, the totem pole PFC 12 can attempt to match the signal IS2 to the signal AIM, which is a target waveform of the signal IS2, while switching between the first and second states a plurality of times.

The control circuit 16 generates the signal PWM based on the signal IDIF, which is a comparison result between the signal AIM and the signal IS1, while AC1<AC2 is satisfied. That is, the control circuit 16 generates the signal PWM so that a difference between the signal AIM and the signal IS1 decreases and inputs the signal PWM as the signal G1 to the gate terminal of the first semiconductor switch S1. Thus, the totem pole PFC 12 turns the first semiconductor switch S1 on or off with the signal G1 while AC1<AC2 is satisfied. Thus, the totem pole PFC 12 switches between the third and fourth states illustrated in FIG. 2 in accordance with the signal G1. In the third state, the signal IS1 decreases (linearly decreases). In the fourth state, the signal IS1 increases (linearly increases). The totem pole PFC 12 controls the durations of the third and fourth states by performing pulse width control. Specifically, the totem pole PFC 12 controls ON duty of the signal G1 (equivalent to the duration of the third state within one period) by fixing a frequency. Thus, the duration of the fourth state (which is the duration of the third state subtracted from the duration within one period) is also simultaneously determined.

As a result, as illustrated in FIG. 7, a current flowing from the second resistor R2 to the connection point M becomes a sinusoidal wave with the same phase as the signal ACV, as such is indicated by the signal IS2.

As described above, the power conversion device 1 includes the totem pole type power factor correction circuit (totem pole PFC) 12, the current detection circuit 17, and the control circuit 16.

The totem pole PFC 12 includes the first coil L1 connected to the first terminal of the power supply AC via the filter circuit 11, the first semiconductor switch S1 of which the source terminal is connected to the first coil L1, the second semiconductor switch S2 of which the drain terminal is connected to the source terminal of the first semiconductor switch S1, the first diode D1 of which the cathode is connected to the drain terminal of the first semiconductor switch S1 and the anode is connected to the second terminal of the power supply AC via the filter circuit 11, the second diode D2 of which the anode is connected to the source terminal of the second semiconductor switch S2 and the cathode is connected to the second terminal of the power supply AC via the filter circuit 11, and the first smoothing capacitor C1 connected to the cathode of the first diode D1 and the anode of the second diode D2.

The current detection circuit 17 includes the series connection of a first current detector (first resistor R1) and a second current detector (second resistor R2) connected between the first coil L1 and the first terminal of the power supply AC. The signal IS1, which is a detection result of a current by the first current detector, indicates a current flowing from the first resistor to the connection point between the first and second resistors. The signal IS2, which is a detection result of a current by the second current detector, indicates a current flowing from the second resistor to the connection point between the first and second resistors.

The control circuit 16 performs the pulse width control to turn the first semiconductor switch S1 and the second semiconductor switch S2 on or off based on the signal IS1 or IS2.

In such a configuration, one of the signals IS1 and IS2 is detected as a positive value. Therefore, the current detection circuit 17 can directly input the signals IS1 and IS2 to the control circuit 16 without being converted into the signal of the GND standard. As a result, it is possible to realize highly efficient power conversion with the simple configuration.

The control circuit 16 includes the polarity detection circuit 33 that detects polarity of an AC voltage supplied from the power supply AC using the GND voltage, which is a voltage of a connection point between the first and second current detectors, as a standard. The control circuit 16 switches a switch performing the pulse width control based on a detection result of the polarity detection circuit 33 between the first semiconductor switch S1 and the second semiconductor switch S2.

Based on the detection result of the polarity detection circuit 33, the control circuit 16 switches between using a detection result from the first current detector or the second current detector for pulse width control.

The control circuit 16 turns the second semiconductor switch S2 on or off based on the signal IS2, which is a detection result of a current by the second current detector, when the first terminal of the power supply AC is at a positive potential. The control circuit 16 turns the first semiconductor switch S1 on or off based on the signal IS1, which is a detection result of a current by the first current detector, when the second terminal of the power supply AC is at a positive potential.

The control circuit 16 converts the voltage across the first smoothing capacitor C1 into a setting voltage using the GND voltage, which is a voltage of a connection point between the first and second current detectors, as a standard, and performs the pulse width control based on the converted voltage.

In this way, the power conversion device 1 can control the current flowing in the first coil L1 to be a sinusoidal wave with the same phase the voltage from the power supply AC by switching a switch performing the pulse width control between the first semiconductor switch S1 and the second semiconductor switch S2 in accordance with the polarity of the voltage of the power supply AC. As a result, the power conversion device 1 can realize a reduction in a recovery loss with a simpler configuration.

In the foregoing embodiment, a configuration in which the second semiconductor switch S2 is turned on or off while AC1>AC2 is satisfied, and the first semiconductor switch S1 is turned on or off while AC1<AC2 is satisfied was described, but embodiments are not limited to this configuration. The control circuit 16 may turn on the first semiconductor switch S1 while AC1>AC2 is satisfied and the second semiconductor switch S2 is turned off, and may turn on the second semiconductor switch S2 while AC1<AC2 is satisfied and the first semiconductor switch S1 is turned off.

While AC1>AC2 is satisfied and the second semiconductor switch S2 is turned off, the first semiconductor switch S1 functions as a body diode between the source terminal and the drain terminal. While AC1<AC2 is satisfied and the first semiconductor switch S1 is turned off, the second semiconductor switch S2 functions as a body diode between the source terminal and the drain terminal.

However, typically a loss when the first semiconductor switch S1 is turned on is less than the loss if the first semiconductor switch S1 acts as a body diode. Similarly, a loss when the second semiconductor switch S2 is turned on is less than the loss if the second semiconductor switch S2 acts as a body diode. Therefore, by turning on the first semiconductor switch S1 while AC1>AC2 is satisfied and the second semiconductor switch S2 is turned off and turning on the second semiconductor switch S2 while AC1<AC2 is satisfied and the first semiconductor switch S1 is turned off, as described above, it is possible to reduce the loss in the circuits of the totem pole PFC 12.

Similarly, each of the first diode D1 and the second diode D2 may be substituted with MOSFETs in some examples. Specifically, the first diode D1 may be configured as a body diode of a FET that is turned on while AC1>AC2 is satisfied and is turned off while AC1<AC2 is satisfied. Likewise, the second diode D2 may be configured as a body diode of a FET that is turned off while AC1>AC2 is satisfied and is turned on while AC1<AC2 is satisfied. Even in such a configuration, it is possible to reduce the loss in the circuits of the totem pole PFC 12.

In the foregoing embodiment, it was considered necessary for the first semiconductor switch S1 and the second semiconductor switch S2 to be formed of a wide bandgap semiconductor for high-speed switching. However, a current flowing in the first diode D1 and the second diode D2 can be a 50 Hz component, which is a frequency of the power supply AC. Therefore, when a synchronous rectification FET is used instead of the first diode D1 and the second diode D2, a FET formed of a silicon semiconductor with relatively slow reaction can be used.

When a synchronous rectification FET is used instead of the first diode D1 and the second diode D2, a cathode side of the first diode D1 and the second diode D2 can be substituted with a drain terminal of the FET and an anode side of the first diode D1 and the second diode D2 can be substituted with a source terminal of the FET.

In the foregoing embodiment, a configuration in which the polarity detection circuit 33 detects polarity of an AC voltage supplied from the power supply AC based on the signal ACV and outputs the detection result as the signal ACP was described. In some examples, the polarity detection circuit 33 may be realized by a combination of a processor and a memory that stores a program or otherwise by an analog circuit.

Figure 8:
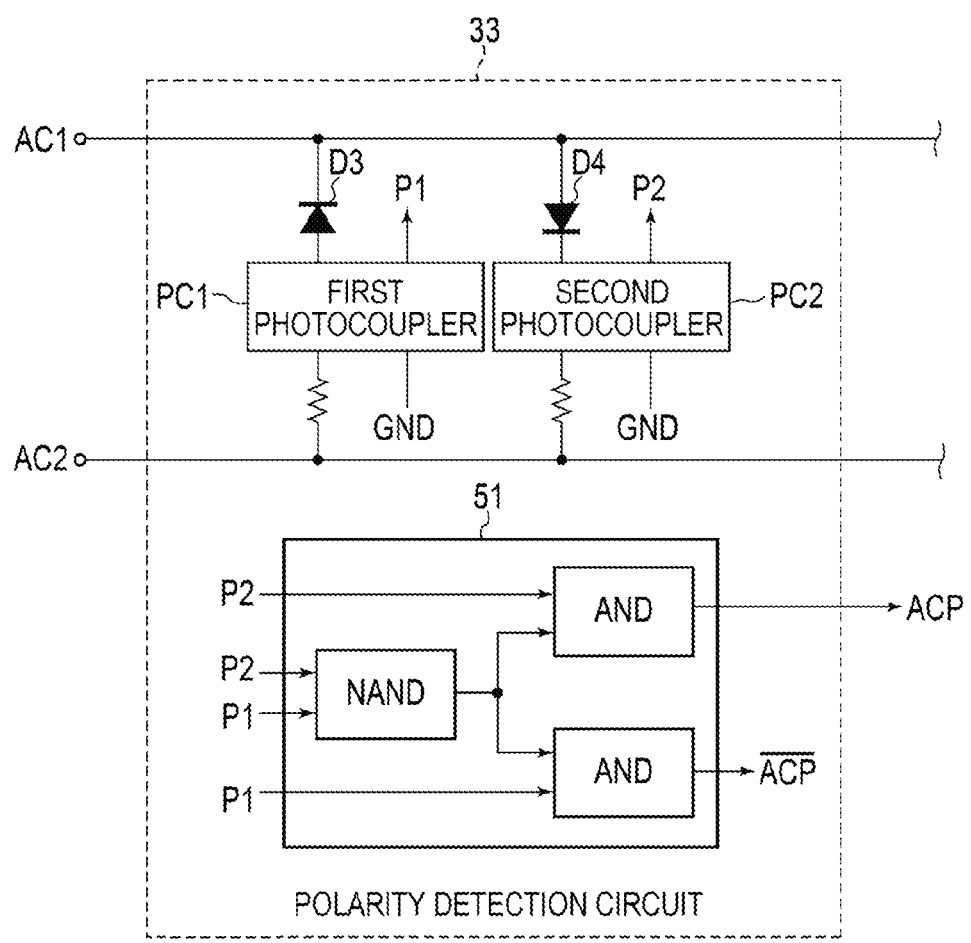
FIG. 8 depicts a polarity detection circuit.

When the polarity detection circuit 33 is configured as an analog circuit, the polarity detection circuit 33 has, for example, a configuration illustrated in FIG. 8. In the example of FIG. 8, the polarity detection circuit 33 is provided outside of the control circuit 16 and outputs the signal ACP to a first selector 37 and a second selector 40 of the control circuit 16. The polarity detection circuit 33 includes, for example, a third diode D3, a fourth diode D4, a first photocoupler PC1, a second photocoupler PC2, and a logical circuit 51.

In the third diode D3, a cathode is connected to the first terminal AC1 of the filter circuit 11 and an anode is connected to a cathode of the first photocoupler PC1. An anode of the first photocoupler PC1 is connected to the second terminal AC2 of the filter circuit 11 via a resistor, a collector is connected to GND, and an emitter is connected to the logical circuit 51.

In the fourth diode D4, an anode is connected to the first terminal AC1 of the filter circuit 11 and a cathode is connected to an anode of the second photocoupler PC2. A cathode of the second photocoupler PC2 is connected to the second terminal AC2 of the filter circuit 11 via a resistor, a collector is connected to GND, and an emitter is connected to the logical circuit 51.

In this configuration, when AC1<AC2 is satisfied, a current flows from the anode to the cathode in the first photocoupler PC1 and a signal P1 is output to the logical circuit 51. When AC1>AC2 is satisfied, a current flows from the anode to the cathode in the second photocoupler PC2 and a signal P2 is output to the logical circuit 51.

The logical circuit 51 is a circuit that outputs the signal ACP indicating "1" when the signal P2 is supplied from the second photocoupler PC2, and outputs the signal ACP indicating "0" when the signal P1 is supplied from the first photocoupler PC1. For example, the logical circuit 51 includes one NAND circuit and two AND circuits. The signals P1 and P2 are input to the NAND circuit. An output of the NAND circuit and the signal P2 are input to a first AND circuit. The output of the NAND circuit and the signal P1 are input to a second AND circuit.

In this configuration, the first AND circuit outputs "1" when the signal P2 is input and the signal P1 is not input. The first AND circuit outputs "0" when the signal P2 is not input and the signal P1 is input. That is, an output of the first AND circuit is supplied as the signal ACP to the first selector 37 and the second selector 40 of the control circuit 16. The second AND circuit outputs "1" when the signal P2 is not input and the signal P1 is input. The first AND circuit outputs "0" when the signal P2 is input and the signal P1 is not input. That is, the output of the first AND circuit is an inversion of the signal ACP.

Other circuits of the control circuit 16 may also be realized by a logical circuit or a combination of a processor and a program rather than the analog circuit.

For example, the first comparator 32 and the second comparator 38 may convert two input signals into digital signals through AD (analog-digital) conversion or the like and calculate a difference between the digital values. The first comparator 32 and the second comparator 38 can be realized by, for example, the following code/algorithm.

$Sout=f(Sin1, Sin2)$

{

$Sout=Sin1-Sin2;$

}

The multiplier 36 may convert two input signals into digital signals through AD conversion or the like and multiply the digital values. The multiplier 36 is realized by, for example, the following code/algorithm:

$MUL=f(Sin1, Sin2)$

{

$MUL=Sin1*Sin2;$

}

As described above, when the circuit is realized by a combination of a processor and a program, input signals are converted into digital signals through AD conversion or the like and an arithmetic operation is performed based on digital values. Further, when a circuit on the rear stage is an analog circuit, the digital signals may be converted into analog signals through DA conversion or the like and the analog signals may be output.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A power conversion device, comprising:
a first current detector;
a second current detector connected between the first current detector and a first power supply terminal, a connection point between the first current detector and the second current detector being a ground potential;

a coil having a first end connected to the first power supply terminal through the first and second current detectors connected in series;
a first semiconductor switch with a first terminal connected to a second end of the coil;
a second semiconductor switch with a first terminal connected to the second end of the coil;
a first diode with a cathode connected to a second terminal of the first semiconductor switch and an anode connected to a second power supply terminal;
a second diode with an anode connected to a second terminal of the second semiconductor switch and a cathode connected to the second power supply terminal;
a smoothing capacitor connected in parallel with the first and second diodes and connected between the cathode of the first diode and the anode of the second diode; and
a control circuit configured to turn the first and second semiconductor switches on or off based on a current detection of the first current detector and a current detection of the second current detector.

2. The power conversion device according to claim 1, wherein the control circuit is configured to perform pulse width modulation to turn the first and second semiconductor switches on or off.

3. The power conversion device according to claim 1, further comprising:
a filter circuit between an alternating current power supply and the first and second power supply terminals.

4. The power conversion device according to claim 1, wherein the first current detector is a first resistor and the second current detector is a second resistor.

5. The power conversion device according to claim 1, wherein the control circuit is configured to:
turn the second semiconductor switch on or off based on a detection result from the first current detector when the first power supply terminal is at a positive potential, and
turn the first semiconductor switch on or off based on a detection result from the second current detector when the second power supply terminal is at a positive potential.

6. The power conversion device according to claim 1, wherein
the control circuit includes a polarity detection circuit configured to detect polarity of an alternating-current voltage supplied at the first and second power supply terminals, a voltage at the connection point between the first and second current detectors being used as a reference by the polarity detection circuit, and
the control circuit is configured to switch between using one of the first or second semiconductor switches for performing pulse width control based on the polarity detected by the polarity detection circuit.

7. The power conversion device according to claim 6, wherein the control circuit switches between using a current detection result from the first current detector or the second current detector for performing the pulse width control based on the polarity detected by the polarity detection circuit.

8. The power conversion device according to claim 1, wherein
the first diode is a body diode of a first field effect transistor that is connected to be turned on while the first power supply terminal is at a positive potential and turned off while the second power supply terminal is at a positive potential, and the second diode is a body diode of a second field effect transistor that is connected to be turned off while the first power supply terminal is at a positive potential and turned on while the second power supply terminal is at a positive potential.

9. A power conversion device, comprising:
a first current detector;
a second current detector connected between the first current detector and a first power supply terminal, a connection point between the first current detector and the second current detector being a ground potential;
a power factor correction circuit including:
a coil having a first end connected to the first power supply terminal through the first and second current detectors connected in series,
a first semiconductor switch with a first terminal connected to a second end of the coil,
a second semiconductor switch with a first terminal connected to the second end of the coil,
a first diode with a cathode connected to a second terminal of the first semiconductor switch and an anode connected to a second power supply terminal,
a second diode with an anode connected to a second terminal of the second semiconductor switch and a cathode connected to the second power supply terminal, and
a smoothing capacitor connected in parallel with the first and second diodes and connected between the cathode of the first diode and the anode of the second diode; and
a control circuit configured to turn the first and second semiconductor switches on or off based on a current detection of the first current detector and a current detection of the second current detector.

10. The power conversion device according to claim 9, wherein the control circuit is configured to perform pulse width modulation to turn the first and second semiconductor switches on or off.

11. The power conversion device according to claim 9, wherein the first and second power supply terminals are connected to an alternating current power supply.

12. The power conversion device according to claim 9, further comprising:
a filter circuit between an alternating current power supply and the first and second power supply terminals.

13. The power conversion device according to claim 9, wherein the first current detector is a first resistor and the second current detector is a second resistor.

14. The power conversion device according to claim 9, wherein
the control circuit includes a polarity detection circuit configured to detect polarity of an alternating-current voltage supplied at the first and second power supply terminals, a voltage at the connection point between the first and second current detectors being used as a reference for the polarity detection circuit, and
the control circuit is configured to switch between using one of the first or second semiconductor switches for performing pulse width control based on the polarity detected by the polarity detection circuit.

15. The power conversion device according to claim 14, wherein the control circuit switches between using a current detection result from the first current detector or the second current detector for performing the pulse width control based on the polarity detected by the polarity detection circuit.

16. The power conversion device according to claim 9, wherein the control circuit is configured to:
   turn the second semiconductor switch on or off based on a detection result from the first current detector when the first power supply terminal is at a positive potential, and
   turn the first semiconductor switch on or off based on a detection result from the second current detector when the second power supply terminal is at a positive potential.

17. The power conversion device according to claim 9, wherein the control circuit is configured to:
   convert a voltage across the smoothing capacitor into a setting voltage by using the voltage at the connection point between the first and second current detectors as a reference, and
   perform pulse width control based on the setting voltage.

18. The power conversion device according to claim 17, wherein the control circuit is configured to:
   turn the first semiconductor switch on while the first power supply terminal is at a positive potential and the second semiconductor switch is off, and
   turn the second semiconductor switch on while the second power supply terminal is at a positive potential and the first semiconductor switch is off.

19. The power conversion device according to claim 9, wherein
   the first diode is a body diode of a first field effect transistor that is connected to be turned on while the first power supply terminal is at a positive potential and turned off while the second power supply terminal is at a positive potential, and
   the second diode is a body diode of a second field effect transistor that is connected to be turned off while the first power supply terminal is at a positive potential and turned on while the second power supply terminal is at a positive potential.

20. The power conversion device according to claim 9, wherein the power factor correction circuit is a totem pole-type.

* * * * *